US008567723B2

(12) United States Patent
Etzkorn et al.

(10) Patent No.: US 8,567,723 B2
(45) Date of Patent: Oct. 29, 2013

(54) AUTOMATED RECEIVER AIRCRAFT IDENTIFICATION (ARAI) FOR IN-FLIGHT REFUELING

(75) Inventors: Karen M. Etzkorn, Edwardsville, IL (US); Eric P. Oman, Lake Saint Louis, MO (US); Dallas S. Scholes, Buckley, WA (US)

(73) Assignee: The Boeing Company, Chicago, IL (US)

( * ) Notice: Subject to any disclaimer, the term of this patent is extended or adjusted under 35 U.S.C. 154(b) by 507 days.

(21) Appl. No.: 12/620,599

(22) Filed: Nov. 18, 2009

(65) Prior Publication Data

US 2012/0153084 A1  Jun. 21, 2012

Related U.S. Application Data (60) Provisional application No. 61/167,784, filed on Apr. 8, 2009.

(51) Int. Cl.
*B64D 39/00* (2006.01)
*G01C 23/00* (2006.01)
*G05D 1/00* (2006.01)
*G05D 3/00* (2006.01)
*G06F 7/00* (2006.01)
*G06F 17/00* (2006.01)

(52) U.S. Cl.
USPC .......................................... 244/135 A; 701/3

(58) Field of Classification Search
USPC .......... 244/135 A, 135 R, 117, 135 B, 135 C; 701/29.1, 29.3, 29.6, 33.4, 123, 3; 137/258
See application file for complete search history.

(56) References Cited

U.S. PATENT DOCUMENTS

| 2,693,931 | A | * | 11/1954 | Emerick et al. ................. 251/50 |
| 3,603,359 | A | * | 9/1971 | Belue ............................. 141/208 |
| 3,917,196 | A | * | 11/1975 | Pond et al. ...................... 342/23 |
| 4,025,193 | A | * | 5/1977 | Pond et al. ...................... 356/5.1 |
| 5,628,351 | A | * | 5/1997 | Ramsey et al. ................. 141/98 |
| 5,906,336 | A | * | 5/1999 | Eckstein .................... 244/135 A |
| 6,275,768 | B1 | * | 8/2001 | Zobell et al. .................. 701/123 |
| 6,966,525 | B1 | * | 11/2005 | Schroeder ................ 244/135 A |

(Continued)

FOREIGN PATENT DOCUMENTS

WO   WO 2009104104 A1 *  8/2009

OTHER PUBLICATIONS

International Search Report and Written Opinion of the International Searching Authority mailed on Mar. 28, 2011 for PCT Application No. PCT/US2010/030234 filed on Apr. 7, 2010—International Searching Authority—European Patent Office.

*Primary Examiner* — Khoi Tran
*Assistant Examiner* — Abby Lin
(74) *Attorney, Agent, or Firm* — Ameh IP; Lowell Campbell; Elahe Toosi (57) ABSTRACT

An aerial identification and fuel inventory control system is disclosed. An RFID transponder mounted on a refueling aircraft transmits an identifier identifying the refueling aircraft in proximity to a fuel delivery aircraft. Substantially just prior to a start of fueling the refueling aircraft, the identifier is automatically logged in the fuel inventory control system. Upon completion of the fueling, a quantity of off-loaded fuel associated with the identifier is automatically logged in the fuel inventory control system. A fueling report may be automatically generated.

19 Claims, 5 Drawing Sheets

(56) References Cited

U.S. PATENT DOCUMENTS

| | | | |
|---|---|---|---|
| 7,887,010 B2 * | 2/2011 | Takacs et al. | 244/135 A |
| 2002/0030142 A1 * | 3/2002 | James | 244/194 |
| 2003/0209633 A1 | 11/2003 | Thal et al. | |
| 2007/0032941 A1 * | 2/2007 | Allen | 701/123 |
| 2007/0205328 A1 | 9/2007 | Iverson et al. | |
| 2008/0099628 A1 * | 5/2008 | Greene | 244/191 |
| 2008/0270027 A1 * | 10/2008 | Stecko et al. | 701/214 |
| 2009/0099724 A1 * | 4/2009 | Kranz et al. | 701/35 |
| 2009/0184205 A1 * | 7/2009 | Matheny | 244/135 A |
| 2010/0072320 A1 * | 3/2010 | Bartov | 244/135 A |
| 2010/0228415 A1 * | 9/2010 | Paul | 701/22 |

* cited by examiner

AUTOMATED RECEIVER AIRCRAFT IDENTIFICATION (ARAI) FOR IN-FLIGHT REFUELING

CROSS-REFERENCE TO RELATED APPLICATION

This application claims the benefit of U.S. Provisional Application Ser. No. 61/167,784, filed on Apr. 8, 2009, the content of which is incorporated by reference herein in its entirety.

GOVERNMENT RIGHTS

This invention was made with Government support under Contract Number H94003-04-D-0007 awarded by the Department of Defense. The government has certain rights in this invention.

FIELD

Embodiments of the present disclosure relate generally to aerial refueling. More particularly, embodiments of the present disclosure relate to aircraft identification during aerial refueling.

BACKGROUND

The Air Force can lose millions of dollars each year due to non-reimbursement for fuel off-loaded during aerial refueling by current fuel delivery aircraft. When a refueling aircraft cannot be identified accurately, the Air Mobility Command generally absorbs a cost of the off-loaded fuel.

Fuel delivery aircraft crews currently manually collect and record information for refueling aircraft through a combination of radio voice contact and visual identification of the refueling aircraft tail number. However, operating conditions can exist which may prevent the fuel delivery aircraft crews from getting required identification information from the refueling aircraft. These operating conditions may comprise bad weather, night operations, radio silence, combat situations, and the like. Furthermore, these conditions may additionally tax the attention of tanker crews compounding risks in what can already be an inherently non-optimal operational environment.

After refueling operations have taken place and the refueling data is manually recorded in flight, the fuel delivery aircraft crews then manually enter the refueling data into various electronic systems of record. Manual entry of the refueling data can be inaccurate if an operator has recorded partial or incorrect information in flight, and/or neglects to enter the data after a flight. Furthermore, manual entry of the refueling data can also be inaccurate if the operator, loses some of the refueling transactions recorded on paper, and/or introduces typographical errors when entering the refueling data into the electronic systems.

Therefore, there is a need for systems and methods that provide improved bookkeeping and inventory control for aerial refueling.

SUMMARY

An aerial identification and fuel inventory control system is disclosed. A radio frequency Identification (RFID) transponder mounted on a refueling aircraft transmits an identifier identifying the refueling aircraft in a proximity to a fuel delivery aircraft. Substantially just prior to a start of fueling the refueling aircraft, the identifier is logged in a fuel inventory control system, and upon completion of fueling, a quantity of fuel off-loaded is logged in the fuel inventory control system. A refueling report may be automatically generated.

A first embodiment comprises a system for automatically reporting refueling data for aerial refueling. The system comprises an RFID transponder coupled to a refueling aircraft and operable to automatically transmit identification information for the refueling aircraft in response to a refueling event. The system further comprises an RFID transceiver coupled to a fuel delivery aircraft and operable to automatically receive the identification information in response to the refueling event. The system also comprises a data recorder module operable to automatically record refueling data for the refueling aircraft in response to the refueling event. The system also comprises a range detector module operable to automatically terminate the refueling event when the refueling aircraft is outside a range of the fuel delivery aircraft to obtain an end-fueling indicator. The system also comprises a report generator module coupled to the data recorder module to automatically generate a refueling report in response to the end-refueling indicator.

A second embodiment comprises a method for automatically reporting aerial refueling data. The method comprises automatically transmitting RFID identification information for the refueling aircraft substantially just prior to a refueling event, and automatically receiving the RFID identification information at a fuel delivery aircraft. The method further comprises automatically recording refueling data for the refueling aircraft in response to a completion of the refueling event.

A third embodiment comprises a fuel inventory control system for a fuel delivery aircraft. The system comprises RFID means to identify a refueling aircraft to obtain an identifier, and refueling means to refuel the refueling aircraft. The system further comprises data recording means to automatically log the identifier substantially just prior to a start of a refueling of the refueling aircraft, and to automatically log refueling data in response to a completion of the refueling.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to modulation, RFID data transmission, RFID system architectures, aircraft refueling systems, high lift devices, and other functional aspects of the systems (and the individual operating components of the systems) may not be described in detail herein. In addition, those skilled in the art will appreciate that embodiments of the present disclosure may be practiced in conjunction with a variety of different aircraft control systems, electrical systems and aircraft wing configurations, and that the system described herein is merely one example embodiment of the disclosure.

Embodiments of the disclosure are described herein in the context of practical non-limiting applications, namely, aerial refueling. Embodiments of the disclosure, however, are not limited to such aerial refueling, and the techniques described herein may also be utilized in other refueling applications. For example, embodiments may be applicable to ship refueling, helicopter-ship refueling, fuel tanker-vehicle ground refueling, and the like.

As would be apparent to one of ordinary skill in the art after reading this description, the following are examples and embodiments of the disclosure are not limited to operating in accordance with these examples. Other embodiments may be utilized and structural changes may be made without departing from the scope of the exemplary embodiments of the present disclosure.

Aerial refueling is a process of transferring fuel from a fuel delivery aircraft to a refueling aircraft during flight. The fuel delivery aircraft may comprise, for example but without limitation, narrow body jetliners, wide body jetliners, helicopters, and the like. The refueling aircraft may comprise, for example but without limitation, jet fighters, cargo planes, passenger aircraft, narrow body jetliners, wide body jetliners, helicopters, and the like.

Aerial refueling allows the refueling aircraft to remain airborne for a longer period of time, and to extend its range. At present, aerial refueling is generally used in military operations. In military operations, aerial refueling may be used extensively, for example but without limitation, to extend deployment radius. A series of aerial refueling actions can give an extended range limited not by fuel, but rather by crew fatigue and engineering factors such as engine oil consumption. Aerial refueling can also allow a take-off with a greater payload. A substantially maximum take-off weight is maintained by carrying less fuel and the refueling aircraft can receive additional fuel once airborne. Alternatively, a shorter take-off roll can be achieved by having a lighter fuel load before refueling after take-off.

Usually, the fuel delivery aircraft is specially designed for aerial refueling, although refueling pods can be fitted to existing aircraft. The two common approaches for aerial refueling are the boom and receptacle system, and the probe and drogue system. Some fuel delivery aircraft have both a boom and one or more complete hose-and-drogue systems. Where these are attached to wings, the system is known as the Multi-Point Refueling System or MPRS. The USAF KC-10 has both a flying boom and also a separate hose-and-drogue system. Both are on an aircraft centerline located at a tail of the fuel delivery aircraft, so one of the systems can be used at a time. However, such a system allows various types of probe and receptacle-equipped aircraft to be refueled, including large aircraft that are probe-equipped and may not have the maneuverability to take fuel from an off-centerline wing pod. Many KC-135s and some KC-10s are also equipped with dual under-wing hose-and-drogue attachments known as Wing Air Refueling Pods (WARPs).

There is also a combination "boom drogue adaptor" that combines the first two methods. There are also buddy pod and wing-to-wing systems. A "buddy store" or "buddy pod" is an external pod loaded on an aircraft hardpoint that contains a hose and drogue Hose Drum Unit (HDU). Buddy stores allow aircraft to be reconfigured for "buddy tanking" other aircraft. Buddy tanking allows an air combat force without dedicated/specialized fuel delivery aircraft support (e.g., a carrier air wing) to extend the range of its strike aircraft. Wing-to-wing is a method, similar to the probe and drogue method but, the fuel delivery aircraft releases a flexible hose from its wingtip to another aircraft's wingtip in this method.

Existing refueling data collection solutions comprise a manual process relying on manual inputs. In the manual data collection process, a boom operator may manually write down the tail number and other pertinent refueling information available to her/him, and after the flight he/she may manually enter the refueling information in to an appropriate billing system(s). Then another person may have to verify whether the refueling information or data is accurate and manually reformat the data so that it can be entered into the billing system(s). In contrast, embodiments of the present disclosure electronically ensure accuracy of the fueling process.

Figure 1:
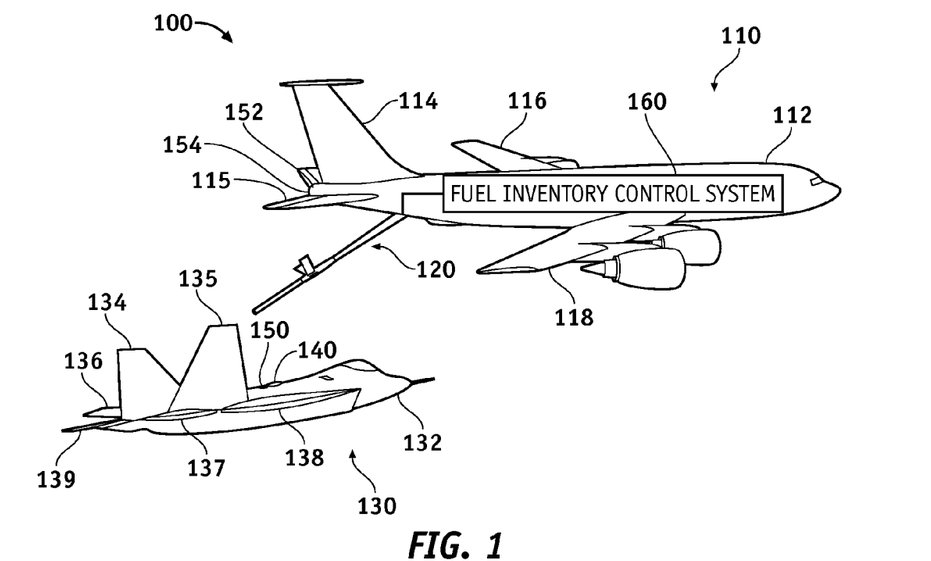
FIG. 1 is an illustration of an aerial refueling operation showing a refueling aircraft in a vicinity of a fuel delivery aircraft comprising a boom-type fueling apparatus according to an embodiment of the disclosure.

FIG. 1 is an illustration of an aerial refueling operation 100 showing a refueling aircraft 130 in a vicinity of a fuel delivery aircraft 110 comprising a boom-type fueling apparatus according to an embodiment of the disclosure. In the embodiment shown in FIG. 1, the fuel delivery aircraft 110 comprises a fuselage 112, a vertical stabilizer 114, a port wing 116, a starboard wing 118, a fueling boom 120, and a starboard horizontal stabilizer 115. The fuel delivery aircraft 110 also comprises a fuel delivery aircraft RFID transceiver 152 and a fuel inventory control system 160.

As shown in FIG. 1, the refueling aircraft 130 comprises a fuselage 132, two vertical stabilizers 134/135, a port wing 136, a starboard wing 138, a fuel receiving structure 140, a port horizontal stabilizer 139, and a starboard horizontal stabilizer 137. The refueling aircraft 130 also comprises a refueling aircraft RFID transponder 150.

During an airborne fueling operation, the fuel delivery aircraft 110 is usually flown at a predetermined altitude, course and speed. The refueling aircraft 130 is maneuvered to effect coupling between the fueling boom 120 and the fuel receiving structure 140 so that fuel may be delivered via the fueling boom 120 to the fuel receiving structure 140 and then to fuel tanks (not shown) located within the refueling aircraft 130 in fluid communication with the fuel receiving structure 140.

The fueling boom 120, often called the Boeing "flying boom", is a system using a rigid, telescoping tube controlled by two small wings that an operator on the fuel delivery aircraft 110 extends and inserts into a receptacle on the refueling aircraft 130. Most boom-equipped fuel delivery aircraft (e.g., KC-135 Stratotanker delivery aircraft, KC-10 Extender), have, for example but without limitation, a single boom and can refuel one aircraft at a time with this mechanism. Some boom-equipped fuel delivery aircraft also have probe-and-drogue systems attached to their wings as explained below in the context of FIG. 4. In the embodiment shown in FIG. 1, the fueling boom 120 is shown in an extended position for fueling operations. The fueling boom 120 may be stowed adjacent to the fuselage 112 or within the fuselage 112 when fuel delivery aircraft 110 is not engaged in the fueling operations.

The fuel delivery aircraft RFID transceiver 152 is coupled to the fuel delivery aircraft 110 and is operable to automatically receive the identification information in response to a refueling event by the refueling aircraft 130. The fuel delivery aircraft RFID transceiver 152 may be located in, for example but without limitation, a tail cone 154 of the fuel delivery aircraft 110, the fueling boom 120, and the like.

The refueling aircraft RFID transponder 150 is coupled to the refueling aircraft 130 and is operable to automatically transmit identification information for the refueling aircraft 130 in response to the refueling event. The refueling aircraft RFID transponder 150 may be activated in response to the refueling aircraft 130 establishing a contact with the fuel delivery aircraft 110 (i.e., hooking up to refuel). Alternatively, the refueling aircraft RFID transponder 150 may be activated in response to the fuel delivery aircraft 110 establishing a contact with the refueling aircraft 130, when the refueling aircraft RFID transponder 150 receives a low level interrogation RF signals from the fuel delivery aircraft RFID transceiver 152. The fuel delivery aircraft RFID transceiver 152 recognizes the refueling aircraft RFID transponder 150 and the fuel delivery aircraft RFID transceiver 152 may be turned off. In some embodiments, once data collection from the refueling aircraft 130 is accomplished, the fuel delivery aircraft RFID transceiver 152 may be disabled for fuel delivery operations automatically. The refueling information is stored on a computing device such as the fuel inventory control system 160 along with other pertinent information collected during the refueling and transmitted to a billing system and/or all other pertinent tracking systems as explained below. This refueling information comprises, for example but without limitation a date, a time stamp, an amount of fuel off-loaded, a tail number, and the like that may also be captured during a refueling operation. The refueling information is then automatically logged and stored, electronically packaged, and sent to an appropriate billing system(s) and other systems of record. Multiple transactions can be stored at once for multiple refueling operations. In this manner, the embodiments save time and more accurately identify the refueling aircraft 130 and the pertinent information to allow for complete and accurate billing to occur, thereby saving the Air Force a significant amount of money. Crew work load is also reduced, thus increasing safety during a non-optimal operation.

The fuel inventory control system 160 may be configured to automatically log the identification information and amount of off-loaded fuel associated with the identification information, and generate a report as explained in more detail below in the context of discussion of FIGS. 7-8.

The fuel delivery aircraft RFID transceiver 152 is suitably coupled to the fuel delivery aircraft 110 to permit receiving the identifying information from the refueling aircraft RFID transponder 150 during an airborne fueling operation involving the refueling aircraft 130 and the fuel delivery aircraft 110. Receipt of identifying information from the refueling aircraft 130 may occur at any time during the airborne fueling operations. For example but without limitation, identifying information may be received by the fuel delivery aircraft 110: during approach by the refueling aircraft 130 toward the fuel delivery aircraft 110; during fueling while the refueling aircraft 130 is coupled with the fuel delivery aircraft 110 by the fueling boom 120; during break-away and departure by the refueling aircraft 130 from the fuel delivery aircraft 110 after the fueling is completed; and the like. The fuel delivery aircraft RFID transceiver 152 and the refueling aircraft RFID transponder 150 may be situated to permit receiving identifying information from the refueling aircraft RFID transponder 150 while the refueling aircraft 130 is coupled with the fuel delivery aircraft 110 by the fueling boom 120. During this flight orientation, the relative positions of the fuel delivery aircraft 110 and the refueling aircraft 130 are highly predictable, highly stable and substantially closest to each other. A close and stable relative position contributes to more reliable sharing of identifying information between the fuel delivery aircraft 110 and the refueling aircraft 130.

The refueling aircraft RFID transponder 150 and the fuel delivery aircraft RFID transceiver 152 may employ any one or more of several technologies in effecting sharing of identity information between the fuel delivery aircraft 110 and the refueling aircraft 130. More than one refueling aircraft RFID transponder 150 may be coupled to the refueling aircraft 130 (not shown in FIG. 1). The fuel delivery aircraft RFID transceiver 152 may comprise one or more units employing one or more technologies for identifying the refueling aircraft identification. Similarly, the refueling aircraft RFID transponder 150 may comprise one or more units employing one or more technologies for transmitting the refueling aircraft identification information. In this manner, a likelihood of accurately communicating the refueling aircraft identification information between the fuel delivery aircraft 110 and the refueling aircraft 130 increases. The technology employed for the refueling aircraft RFID transponder 150 and the fuel delivery aircraft RFID transceiver 152 may comprise emitting low level signals so that the identification information may be transferred during periods when electromagnetic emissions are limited. For example, electromagnetic emissions may be limited or forbidden, during electromagnetic-silence conditions sometimes observed by aircraft in combat environments.

The refueling aircraft RFID transponder 150 may be, for example and without limitation, embodied in a tag coupled to the fuselage 132, included in paint applied to the refueling aircraft 130, etched in a surface of the refueling aircraft 130, mounted within the refueling aircraft 130, otherwise affixed with or incorporated in refueling aircraft 130, and the like. The refueling aircraft RFID transponder 150 may be, for example and without limitation, embodied in the fuel receiving structure 140. The fuel receiving structure 140 may be configured to close when the refueling aircraft 130 is not engaged in the airborne fueling. The fuel receiving structure 140 may be configured to close so that the fuselage 132 can comprise a more aerodynamically efficient profile than is presented during the airborne fueling. Locating the refueling aircraft RFID transponder 150 within the fuel receiving structure 140 when open, exposes the refueling aircraft RFID transponder 150 for interrogation by the fuel delivery aircraft RFID transceiver 152 during the airborne fueling. The refueling aircraft RFID transponder 150 may be situated in a protected environment during other maneuvers when the fuel receiving structure 140 is closed. Alternatively, the refueling aircraft RFID transponder 150 may be simply covered by a protective coating after being affixed to the refueling aircraft 130.

In one embodiment, the refueling aircraft RFID transponder 150 utilizes an RFID technology. Other technologies that may be employed for the refueling aircraft RFID transponder 150 may be limited in their effectiveness for identifying the refueling aircraft 130. For example, thermally coded systems may be limited in their effective range and may be adversely affected by cold weather as well as by dirt or other deposits atop refueling aircraft RFID transponder 150. Optically coded systems may also be limited in their effective range and may be adversely affected by low visibility or dirt or other deposits upon refueling aircraft RFID transponder 150. Further, placement of elements comprising an optically encoded system may be sometimes difficult because optically encoded systems are limited to line-of-sight between the refueling aircraft RFID transponder 150 and the fuel delivery aircraft RFID transceiver 152 for effective recognition of coded information.

The fuel delivery aircraft RFID transceiver 152 permits locating the refueling aircraft RFID transponder 150 up to, for example but without limitation, approximately 10-14 meters from the fuel delivery aircraft RFID transceiver 152. Line-of-sight may not be required between the RFID refueling aircraft RFID transponder 150 and the fuel delivery aircraft RFID transceiver 152. Dirt or other deposits over the refueling aircraft RFID transponder 150 may not significantly impair electromagnetic communication between the refueling aircraft RFID transponder 150 and the fuel delivery aircraft RFID transceiver 152. The RFID refueling aircraft RFID transponder 150 can be inexpensive and unobtrusive, and may utilize directional antennas. The RFID refueling aircraft transponder 150 may be, for example but without limitation, embodied in a simple adhesive tag that may be affixed within the fuel receiving structure 140, on the fuselage 132 or elsewhere with ease and without significantly affecting performance of the refueling aircraft 130. The refueling aircraft RFID transponder 150 emits low level RF (Radio Frequency) signals in response to low level interrogation RF signals from the fuel delivery aircraft RFID transceiver 152. Signals traded between the refueling aircraft RFID transponder 150 and the fuel delivery aircraft RFID transceiver 152 for sharing the identification information by the fuel delivery aircraft 110, and the refueling aircraft 130 can be of short duration. Such short duration, low-level signals are unlikely to be detected by an undesired entity (e.g., during combat operations).

Capabilities of the aerial identification and fuel inventory control system for automatically reporting aerial refueling data comprise the ability to automatically and accurately identify refueling aircraft during refueling operations, capturing and storing refueling data for accurate billing transactions, and reducing flight crew workload, thus increasing safety. Safety may be increased by reducing workload of crew of the fuel delivery aircraft so the crew can focus on the refueling operations rather than administrative tasks.

Figure 2:
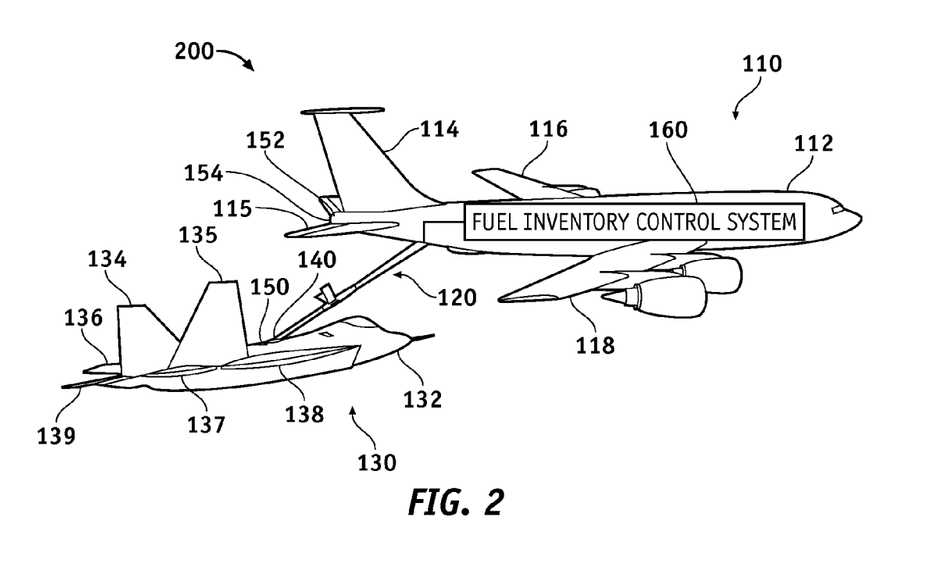
FIG. 2 is an illustration of an aerial refueling operation showing a refueling aircraft docked with a refueling boom of the fuel delivery aircraft of FIG. 1 according to an embodiment of the disclosure.

FIG. 2 is an illustration of an aerial refueling operation 200 showing a refueling aircraft docked with a refueling boom of the fuel delivery aircraft of FIG. 1 in a coupled-for-fueling flight orientation according to an embodiment of the disclosure. The aerial refueling operation 200 has a structure that is similar to the aerial refueling operation 100; therefore, common features, functions, and elements will not be redundantly described here. For this example deployment, the refueling aircraft 130 is configured to suitably effect coupling between the fueling boom 120 and the fuel receiving structure 140. By coupling the fueling boom 120 and the fuel receiving structure 140 fuel may be delivered via the fueling boom 120 via the fuel receiving structure 140 to the fuel tanks (not shown in FIG. 2) located within the refueling aircraft 130 in fluid communication with the fuel receiving structure 140.

In the embodiment shown in FIG. 2, the refueling aircraft RFID transponder 150 is affixed to the refueling aircraft 130 adjacent to the fuel receiving structure 140. In the embodiment shown in FIG. 1, the fuel delivery aircraft RFID transceiver 152 is affixed to a tail cone 154 of the fuel delivery aircraft 110. Alternatively, the fuel delivery aircraft RFID transceiver 152 may be located at any location on the fuel delivery aircraft 110, such as but without limitation, the fuselage 112, the vertical stabilizer 114, the port wing 116, the starboard wing 118, the starboard horizontal stabilizer 115, an end of the fueling boom 120, and the like. The fuel delivery aircraft RFID transceiver 152 is suitably situated on the fuel delivery aircraft 110 to permit receiving the identifying information from the refueling aircraft RFID transponder 150 during an airborne fueling operation involving the refueling aircraft 130 and the fuel delivery aircraft 110. The fuel delivery aircraft RFID transceiver 152 is situated within an RF communication range of the refueling aircraft. The fuel delivery aircraft RFID transceiver 152 and the refueling aircraft RFID transponder 150 allow communication during the fueling process (refueling event). In this manner, during a coupled-for-fueling flight orientation the relative positions of the fuel delivery aircraft 110, and the refueling aircraft 130 are substantially predictable, stable and close together. As mentioned above, a close and stable relative position contributes to more reliable sharing of identifying information between the fuel delivery aircraft 110, and the refueling aircraft 130.

The fuel inventory control system 160 and the fuel delivery aircraft RFID transceiver 152 may be suitably coupled to allow automatic logging and reporting of the identification information and amount of fuel off-loaded to the refueling aircraft 130 as explained below in the context of discussion of FIGS. 7-8. For sake of simplicity, a connection between the fuel delivery aircraft RFID transceiver 152 and the fuel inventory control system 160 is not explicitly shown in FIG. 1. In one embodiment, the fuel inventory control system 160 is located within the fuel delivery aircraft 110. The fuel inventory control system 160 may be coupled to the fuel delivery aircraft 110 by a fuel control unit (not shown) or by another connection. Another connection may comprise, for example but without limitation, a fluid flow meter in a fuel delivery system (not shown in FIG. 4) that delivers fuel to the refueling aircraft 130 via the fueling boom 120.

Figure 3:
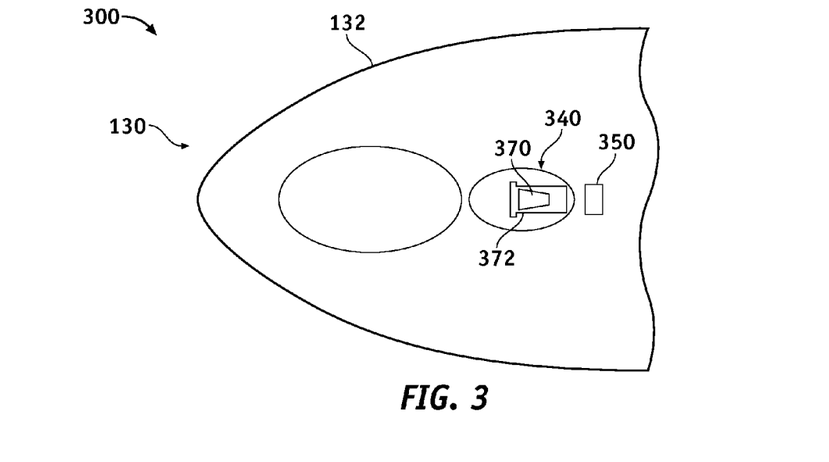
FIG. 3 is an illustration of a schematic diagram of a receiving structure on a refueling aircraft for use in establishing a fueling-coupled relation with a fuel delivery aircraft for airborne fueling using a boom-type fueling apparatus.

FIG. 3 is an illustration of a schematic diagram of a receiving structure 300 on the refueling aircraft 130 for use in establishing a fueling-coupled relation with the fuel delivery aircraft 110 for airborne fueling using a boom-type fueling apparatus. As shown in FIG. 3, the fuselage 132 of the refueling aircraft 130 comprises a fuel receiving structure 340. A refueling aircraft RFID transceiver 350 is affixed to the fuselage 132 substantially adjacent to the fuel receiving structure 340. The fuel receiving structure 340 comprises an intake aperture 370 into which the fueling boom 120 is inserted (see FIG. 2) during the fueling operations. The intake aperture 370 is in fluid communication with the fuel tanks situated within the fuselage 132 (not shown in FIG. 3). A guiding structure 372 substantially surrounds the intake aperture 370. The guiding structure 372 is configured to assist in guiding the fueling boom 120 into proper position for transferring fuel into the intake aperture 370 during the fueling operations. In one embodiment, a guiding structures 372 is coupled to contoured surfaces for receiving the fueling boom 120 within the intake aperture 370 as the refueling aircraft 130 approaches the fuel delivery aircraft 110 from below and behind or aft of the fuel delivery aircraft 110, generally as illustrated in FIGS. 1 and 2. The guiding structure 372 may alternatively or additionally comprise substantially planar structures extending substantially perpendicular from the fuselage 132 behind or aft of the intake aperture 370 (not shown in detail in FIG. 3) to guide the fueling boom 120 into the intake aperture 370 during the airborne fueling.

Figure 4:
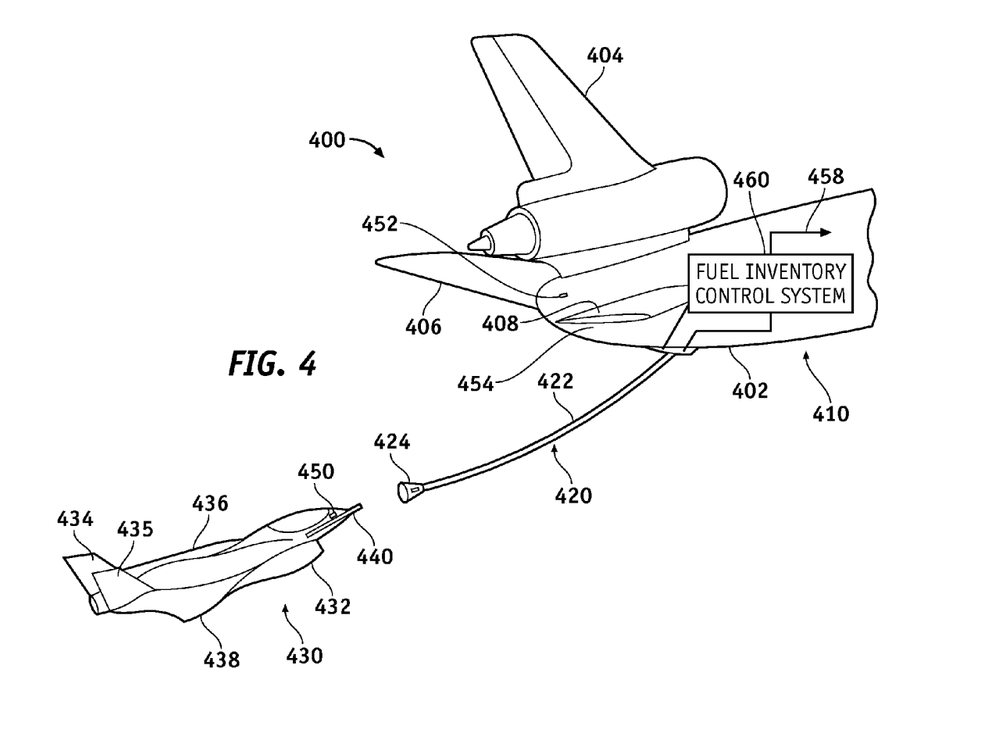
FIG. 4 is an illustration of an aerial refueling operation showing a refueling aircraft in a vicinity of a fuel delivery aircraft comprising a probe-and-drogue-type fueling apparatus according to an embodiment of the disclosure.

FIG. 4 is an illustration of an aerial refueling operation 400 showing a refueling aircraft 430 in a vicinity of a fuel delivery aircraft 410 comprising a probe-and-drogue-type fueling apparatus 420/422/424 according to an embodiment of the disclosure. The aerial refueling operation 400 has a structure that is similar to the embodiments shown in FIGS. 1-3; therefore, common features, functions, and elements will not be redundantly described here. As shown in the embodiment shown in FIG. 4, a rear or aft portion of the fuel delivery aircraft 410 is illustrated comprising a fuselage 402, a tail or vertical stabilizer 404 coupled to the fuselage 402, horizontal stabilizers 406, 408, the fueling unit 420, and a fuel inventory control system 460. The fueling unit 420 comprises a fuel delivery hose 422 coupled to the fuel delivery aircraft 410 and a drogue coupler 424 coupled to the fuel delivery hose 422. In the embodiment shown in FIG. 4, the fueling unit 420 is in an extended position for the fueling operation. The fueling unit 420 may be stowed away adjacent to the fuselage 402 or within the fuselage 402 (not shown in FIG. 4) when the fuel delivery aircraft 410 is not engaged in the fueling operation.

The refueling aircraft 430 comprises a fuselage 432, vertical stabilizers 434, 435 coupled to the fuselage 432, wings 436, 438 and a fuel receiving probe structure 440. As mentioned above, during the airborne fueling operation, the fuel delivery aircraft 410 is usually flown at a predetermined altitude, course and speed. The refueling aircraft 430 is maneuvered to effect coupling between the drogue coupler 424 and the fuel receiving probe 440. By coupling the drogue coupler 424 and the fuel receiving probe 440, fuel may be delivered via the fuel delivery hose 422, via the drogue coupler 424 and via the fuel receiving probe 440 to the fuel tanks (not shown in FIG. 4) located within the refueling aircraft 430 in fluid communication with the fuel receiving probe 440.

At least one refueling aircraft RFID transponder 450 is coupled to the refueling aircraft 430 for transmitting the identification information of the refueling aircraft 430. At least one fuel delivery aircraft RFID transceiver 452 is coupled to the fuel delivery aircraft 410 for receiving the identification information. In the embodiment shown in FIG. 4, the fuel delivery aircraft RFID transceiver 452 is shown attached to the tail cone 454; however, as mentioned above in the context of discussion of the fuel delivery aircraft RFID transceiver 152 in FIG. 2, the fuel delivery aircraft RFID transceiver 452 can be located anywhere on the fuel delivery aircraft 410. The fuel inventory control system 460 is coupled to the fuel delivery aircraft RFID transceiver 452. For sake of simplicity, connection between the fuel delivery aircraft RFID transceiver 452 and the fuel inventory control system 460 is not explicitly shown in FIG. 4. The fuel inventory control system 460 may be coupled to the fuel delivery aircraft 410 by, for example but without limitation, coupling with a fuel control unit (not shown in FIG. 4), connection with a fluid flow meter (not shown in FIG. 4), and the like. The fluid flow meter may be in a fuel delivery system that delivers fuel to refueling aircraft 430 via the fuel delivery hose 422 and drogue coupler 424.

The fuel inventory control system 460 may be equipped with a port 458 for downloading information relating to a fueling operation with refueling aircraft 430 for printing on board, for later transfer, for later transmission or for later printing, whether on-board fuel delivery aircraft 410 or elsewhere as explained below in the context of discussion of FIGS. 7-8. The fuel delivery aircraft RFID transceiver 452 is suitably coupled to the fuel delivery aircraft 410 to permit the receiving identifying information from the refueling aircraft RFID transponder 450 during an airborne fueling operation involving the refueling aircraft 430 and the fuel delivery aircraft 410. Receipt of the identifying information may occur at any time during the airborne fueling operation, for example but without limitation, during approach by the refueling aircraft 430 toward the fuel delivery aircraft 410, during fueling while the refueling aircraft 430 is coupled with the fuel delivery aircraft 410 via the fueling unit 420, during a break-away and a departure by the refueling aircraft 430 from the fuel delivery aircraft 410 after completion of the fueling, and the like.

As mentioned above, it is preferred that the fuel delivery aircraft RFID transceiver 452 and the refueling aircraft RFID transponder 450 be suitably configured to allow receiving the identifying information from the refueling aircraft RFID transponder 450, while the refueling aircraft 430 is coupled with the fuel delivery aircraft 410 by the fueling unit 420. It is during this coupled-for-fueling flight orientation that the relative positions of the refueling aircraft 430, and fuel delivery aircraft 430 are substantially predictable, substantially stable and closest together.

In addition, as mentioned above, a close and stable relative position contributes to more reliable sharing of identifying information between the refueling aircraft 430, and fuel delivery aircraft 410. In one embodiment, the refueling aircraft RFID transponder 450 comprises the RFID technology as explained above in the context of discussion of FIG. 1.

The probe and drogue refueling method employs a flexible hose (the fuel delivery hose 422) trailing from the fuel delivery aircraft 410. The drogue coupler 424 is a fitting resembling a shuttlecock, attached at its narrow end with a valve to the fuel delivery hose 422. The drogue coupler 424 stabilizes the fuel delivery hose 422 in flight and provides an insertion guide for the fuel receiving probe 440. The fuel delivery hose 422 connects to the fuel delivery aircraft 410. When not in use, the fueling unit 420 may be reeled completely into the fuel delivery aircraft 410. The fuel receiving probe 440 may be a rigid arm placed on the refueling aircraft 430 nose or fuselage. The fuel receiving probe 440 may be retracted when not in use. At the end of the fuel receiving probe 440 is a valve (not shown) that is closed until it mates with the drogue coupler 424, after which it opens and allows fuel to pass from fuel delivery aircraft 410 to refueling aircraft 430. The valve (not shown) in the fueling unit 420 generally uses a NATO standard allowing drogue-equipped fuel delivery aircraft 410 from many nations to refuel probe-equipped aircraft from other nations.

In operation, the fuel delivery aircraft 410 flies straight and level and extends the fueling unit 420, which trails behind and below the fuel delivery aircraft 410 under normal aerodynamic conditions. The refueling aircraft 430 extends its fuel receiving probe 440 (if required) and uses normal flight controls to "fly" the fuel receiving probe 440 directly into the drogue coupler 424. A closure rate of approximately two knots is generally required to establish a solid coupling of the fuel receiving probe 440 and the drogue coupler 424. A substantially inadequate closure may cause an incomplete connection and no fuel flow. A substantially excessive closure can trigger a transverse oscillation in the fuel delivery hose 422, potentially severing a tip of the fuel receiving probe 440. An optimal approach is from behind and below the drogue coupler 424. Because the drogue coupler 424 can be relatively light and subject to aerodynamic forces, the drogue coupler 424 can be pushed around by the bow wave of approaching aircraft, exacerbating engagement even in smooth air.

After initial contact, the fueling unit 420 is generally pushed forward by the refueling aircraft 430 a certain distance (typically, a few feet), and the fuel delivery hose 422 is reeled slowly back onto its drum in the fuel delivery aircraft 410. This opens the fuel delivery aircraft's main refueling valve allowing fuel to flow to the drogue coupler 424 under the appropriate pressure. Tension on the fuel delivery hose 422 is aerodynamically "balanced" by a motor in the fuel delivery aircraft 410 so that as the refueling aircraft 430 moves fore and aft, the fuel delivery hose 422 retracts and extends, thus preventing bends in the fuel delivery hose 422 that would cause undue side loads on the fuel receiving probe 440. Fuel flow may typically be indicated by a green light substantially near the fuel delivery aircraft 410. If the fuel delivery hose 422 is pushed in substantially excessively far or substantially not far enough, a cutoff switch can inhibit fuel flow, which may be indicated by an amber light. Disengagement may generally be commanded by the fuel delivery aircraft 410 by a red light.

Boom drogue adapter units such as USAF KC-135 and French Air Force KC-135FR refueling-boom equipped fuel delivery aircraft 410, can be field converted to a probe-and-drogue system using a special adapter unit. In this configuration, the fuel delivery aircraft 410 retains its articulated boom, but has a hose/drogue at the end of it instead of the usual nozzle. The fuel delivery aircraft 410 boom operator can hold the boom in a static position, while the refueling aircraft then flies the probe into the drogue coupler 424.

Figure 5:
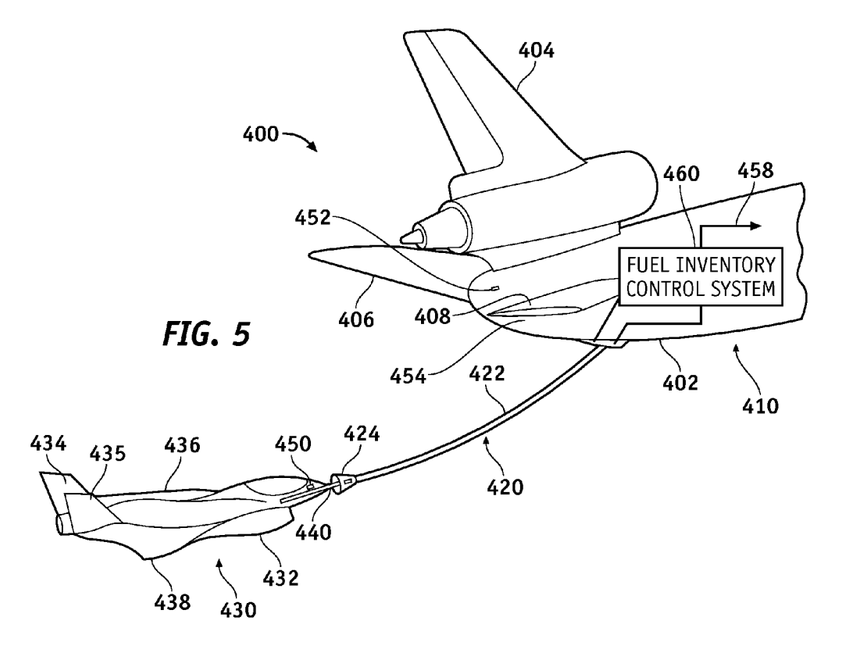
FIG. 5 is an illustration of an aerial refueling operation showing a refueling aircraft docked with a refueling drogue of the fuel delivery aircraft of FIG. 3 according to an embodiment of the disclosure.

FIG. 5 is an illustration of an aerial refueling operation showing a refueling aircraft 430 docked with a refueling drogue of the fuel delivery aircraft 410 of FIG. 3 according to an embodiment of the disclosure. In the embodiment shown in FIG. 5, the fuel delivery aircraft 410 is configured substantially as described in connection with FIG. 4 comprises a fueling unit 420 comprising a delivery hose 422 and an attached drogue coupler 424 in an extended position for the fueling operation. The aerial refueling operation 400 has a structure that is similar to the embodiments shown in FIGS. 1-4; therefore, common features, functions, and elements will not be redundantly described here. The refueling aircraft 430 effects coupling between the drogue coupler 424 and the fuel receiving probe 440 so that fuel may be delivered via the fueling unit 420 and the fuel receiving probe 440 to the fuel tanks (not shown in FIG. 5) located within the refueling aircraft 430 in fluid communication with the fuel receiving probe 440.

In the embodiment shown in FIG. 5, the refueling aircraft RFID transponder 450 is affixed to the refueling aircraft 430 and the fuel delivery aircraft RFID transceiver 452 is affixed to the fuel delivery aircraft 410 at the tail cone 454. However, the fuel delivery aircraft RFID transceiver 452 may be located at any location on/in the fuel delivery aircraft 410 as mentioned above in the context of discussion of the fuel delivery aircraft RFID transceiver 152 above. Similarly, the refueling aircraft RFID transponder 450 may be located at any location on/in the refueling aircraft 430. For example but without limitation, the refueling aircraft RFID transponder 450 may be embodied in a tag affixed to the fuselage 432 located adjacent to the fuel receiving probe 440, as shown in FIG. 5. Alternatively, the refueling aircraft RFID transponder 450 may be embodied in a tag located within the fuel receiving probe 440. The fuel receiving probe 440 may be configured to withdraw into a cavity (see FIG. 6) when the refueling aircraft 430 is not engaged in the airborne fueling so that the fuselage 432 can present a more aerodynamic profile than is presented during the airborne fueling. Locating the refueling aircraft RFID transponder 450 within the fuel receiving probe 440 or within the cavity into which the fuel receiving probe withdraws exposes the refueling aircraft RFID transponder 450 for communication with the fuel delivery aircraft RFID transceiver 452 when the fuel receiving probe 440 is deployed during the airborne fueling. The refueling aircraft RFID transponder 450 is in a protected environment within the cavity into which the fuel receiving probe 440 is withdrawn during other maneuvers. As explained above, the refueling aircraft RFID transponder 450 may be covered simply by a protective coating after being affixed with the refueling aircraft 430 (not shown in FIG. 5).

Figure 6:
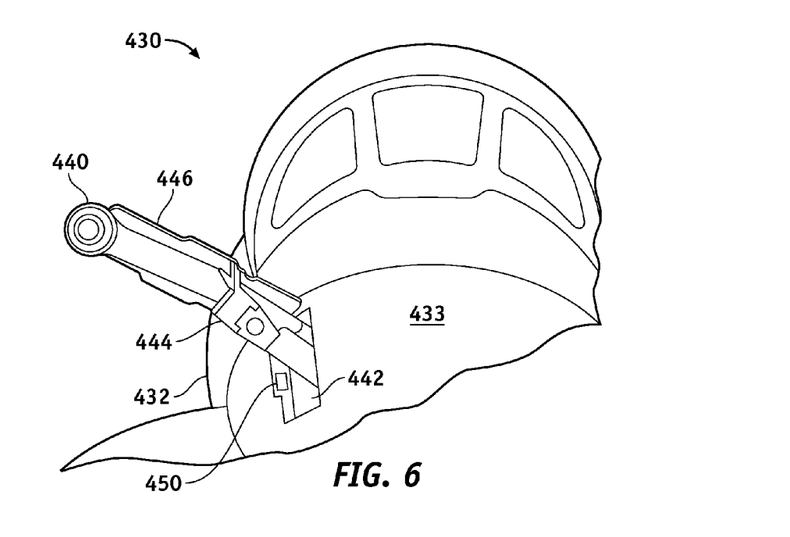
FIG. 6 is an illustration of a schematic diagram of an aircraft probe structure for use in establishing a fueling-coupled relation with a delivery aircraft airborne fueling using a probe-and-drogue-type fueling apparatus.

FIG. 6 is an illustration of a schematic diagram of an aircraft probe structure for use in establishing a fueling-coupled relation with the fuel delivery aircraft 410 airborne fueling using a probe-and-drogue-type fueling apparatus. In FIG. 6, the refueling aircraft 430 comprises a fuel receiving probe 440 in a forward end or nose 433 of the fuselage 432. The fuel receiving probe 440 may be withdrawn within a cavity 442 when refueling the refueling aircraft 430 is not engaged in fueling operations. The fuel receiving probe 440 is manipulated between a stored orientation within the cavity 442 and a fueling position using a deploying mechanism 444. A probe storage cover 446 is preferably coupled to the fuel receiving probe 440 to effectively cover or seal the cavity 442 when the fuel receiving probe 440 is in its stowed orientation within the cavity 442. The refueling aircraft RFID transponder 450 may be coupled to the cavity 442. Alternatively, for example but without limitation, the refueling aircraft RFID transponder 450 may be coupled substantially adjacent to the fuel receiving probe 440, to the probe storage cover 446, to the fuselage 432, to the nose 433, an exterior of the fuselage 432 of the refueling aircraft 430, and the like. The fuel receiving probe 440 is configured to be inserted within the drogue coupler 424 (FIGS. 4 and 5) by maneuvering the refueling aircraft 430 for receiving fuel from the fuel delivery aircraft 410 via the fuel delivery hose 422, the drogue coupler 424 and the fuel receiving probe 440 during the fueling operation. The fuel receiving probe 440 is in fluid communication with the fuel tanks situated within the fuselage 432 (not shown in FIG. 6).

Figure 7:
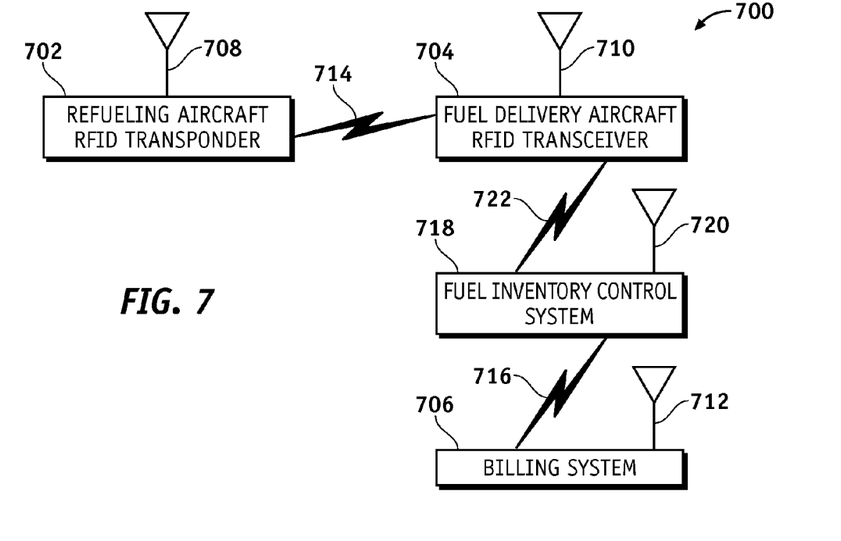
FIG. 7 is an illustration of a schematic functional diagram showing an exemplary radio communication environment according to an embodiment of the disclosure.

FIG. 7 is an illustration of a schematic block diagram showing an exemplary wireless radio communication environment 700 (system 700) for a refueling aircraft 130/430 and a fuel delivery aircraft 110/410 according to an embodiment of the disclosure. A practical embodiment of the exemplary wireless radio communication environment 700 comprises additional components and elements configured to support known or conventional operating features that need not be described in detail herein. The wireless radio communication environment 700 generally comprises a refueling aircraft RFID transponder 702 (150 in FIG. 1) coupled to the refueling aircraft 130/430, a fuel delivery aircraft RFID transceiver 704 (152 in FIG. 1), a fuel inventory control system 718 (160 in FIG. 1), and a billing system 706.

In the example embodiment, the wireless radio communication environment 700 can be used to transmit and receive RFID data from the refueling aircraft 130/430 and the fuel delivery aircraft 110/410 respectively. A query from the fuel delivery aircraft transceiver 704 may be sent to the refueling aircraft RFID transponder 702 seeking identification information from the refueling aircraft RFID transponder 702 in anticipation or response to a refueling event. In this manner, the refueling aircraft RFID transponder 702 transmits its identification information in response to a refueling event. Transmission of the RFID data may stop once the RFID data read is captured. The fuel delivery aircraft RFID transceiver 704 continuously and automatically receives the identification information for the duration of the refueling event and automatically records the RFID identification information in response to the refueling event. The method further comprises automatically recording refueling data for the refueling aircraft 130/430 at a completion of the refueling event. The method may also comprise automatically generating a refueling report in response to an end of the refueling event.

The wireless radio communication environment 700 may comprise any number of communication modules, any number of network communication modules, any number of processor modules, and any number of memory modules. The wireless radio communication environment 700 illustrated herein depicts a simple embodiment for ease of description.

In the example wireless radio communication environment 700 the refueling aircraft RFID transponder 702, and the fuel delivery aircraft RFID transceiver 704 each comprise a transmitter module and a receiver module (not shown in FIG. 7). The refueling aircraft RFID transponder 702 and the fuel delivery aircraft RFID transceiver 704 are configured to communicate via a wireless data communication link 714. The fuel delivery aircraft RFID transceiver 704 is configured to wirelessly communicate with the fuel inventory control system 718 via a wireless data communication link 722 and/or via a wire (not shown). The fuel inventory control system 718 is configured to transmit the refueling data to the billing system 706 via a data communication link 716.

For this example, the refueling aircraft RFID transponder 702, and the fuel delivery aircraft RFID transceiver 704 are coupled to their respective antenna to receive and transmit RFID data respectively. The refueling aircraft RFID transponder 702 is coupled to a refueling aircraft RFID transponder antenna 708, and the fuel delivery aircraft RFID transceiver 704 is coupled to a fuel delivery aircraft RFID transceiver antenna 710. Similarly, the billing system 706 may be coupled to a billing system antenna 712 for off aircraft transmission of billing data. The fuel inventory control system 718 may communicate with the fuel delivery aircraft RFID transceiver 704 and the billing system 706 via the fuel inventory control system antenna 720. Alternatively, the fuel inventory control system 718 may communicate with the fuel delivery aircraft RFID transceiver 704 and the billing system 706 via wire (not shown). The refueling aircraft RFID transponder 702, the fuel delivery aircraft RFID transceiver 704, the billing system 706, and the fuel inventory control system 718 are configured to cooperate with a suitably configured RF antenna arrangement 708/710/712/720 respectively that can support a particular wireless communication protocol and modulation scheme. Alternatively, the fuel inventory control system 718 can be configured via a suitable wired configuration arrangement (not shown). In the example embodiment, the refueling aircraft RFID transponder 702, and the fuel delivery aircraft RFID transceiver 704 are configured to comply with a standardized RFID data communication protocol. The billing system antenna 712 and the fuel inventory control system antenna 720 are configured to support, for example but without limitation, a standardized data communication protocol or industry standard such as the Third Generation Partnership Project Long Term Evolution (3GPP LTE), Third Generation Partnership Project 2 Ultra Mobile Broadband (3GPP2 UMB), Time Division-Synchronous Code Division Multiple Access (TD-SCDMA), and Wireless Interoperability for Microwave Access (WiMAX), and the like.

RF energy or signals in the wireless radio communication environment 700 can be measured, detected, or otherwise diagnosed by a suitably configured diagnostic probe. In a practical embodiment, the RFID identification signal form the refueling aircraft RFID transponder 702 is in compliant with a standard RFID data communication protocol, such as EPC Class 0, EPC Class 1, or EPC Class 1 Gen. 2.

Figure 8:
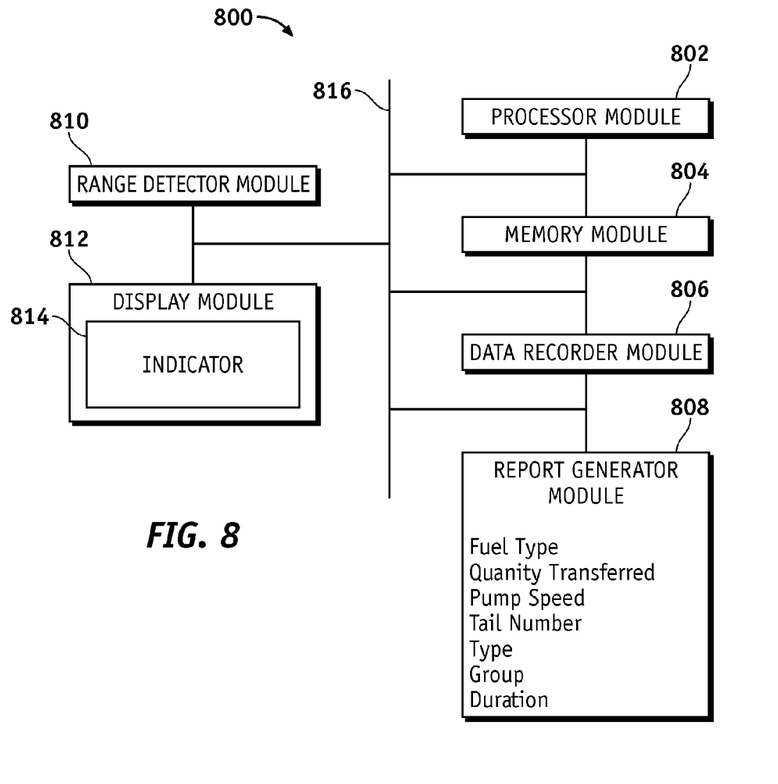
FIG. 8 is an illustration of a schematic functional block diagram showing detail of an exemplary fuel inventory control system shown in FIG. 7 according to an embodiment of the disclosure.

For simplicity, a connection between the fuel delivery aircraft RFID transceiver 704 and the fuel inventory control system 800 is not explicitly shown in FIG. 8. In one embodiment, the fuel inventory control system 718 may be coupled to the fuel delivery aircraft 110. In another embodiment, the fuel inventory control system 800 may be coupled to the refueling aircraft 130. If the fuel inventory control system 718 is coupled to the refueling aircraft 130, communication may be provided between the fuel delivery aircraft 110 and the refueling aircraft 130 by a communication hookup. The communication hookup established when the fuel delivery aircraft 110 and the refueling aircraft 130 are coupled together in the fueling orientation as described above in the context of discussion of FIGS. 2 and 5. The fuel inventory control system 718 may be coupled to the fuel delivery aircraft 110 via a fuel control unit (not shown). Alternatively, the fuel inventory control system 718 may be coupled to the fuel delivery aircraft 110 via a connection with a fluid flow meter in the fuel delivery system (not shown) that delivers fuel to the refueling aircraft 130 via the fueling boom 120. The fluid flow meter may be located in either of the fuel delivery aircraft, or the refueling aircraft 130.

In an embodiment, the fuel inventory control system 718 may be part of the fuel delivery aircraft 110. Alternately, the fuel inventory control system 718 may be used, for example but without limitation, in a mobile phone, a personal digital assistant (PDA) such as a Blackberry device, Palm Treo, MP3 player, or other similar portable device. In some embodiments the fuel delivery aircraft RFID transceiver 704 may be, for example but without limitation, a personal wireless computer such as a wireless notebook computer, a wireless palmtop computer, or other mobile computer device. The fuel inventory control system 718 is explained in more detail in the context of discussion of FIG. 8 below.

The billing system 706 may be, for example but without limitation, located on-board the fuel delivery aircraft 110, remotely located on the ground, on a ship, in a mobile phone, a personal digital assistant (PDA) such as a Blackberry device, Palm Treo, MP3 player, or other similar portable device, and the like. The appropriate transaction can then be electronically built by the fuel inventory control system 718 and transmitted to the billing system 706 and/or all other pertinent tracking systems. Data security for the wireless radio communication environment 700 can be maintained to ensure about 100 percent accuracy of the accounting transactions. The identification information utilized by the wireless radio communication environment 700 can rely on the proven Write Once Read Many (WORM) technology in passive RFID tags and ensures the verification of refueling aircraft authorized to receive fuel.

FIG. 8 is an illustration of a schematic functional block diagram (system 800) showing detail of an example fuel inventory control system 718 shown in FIG. 7. The embodiment shown in FIG. 8 continuously automatically receives the identification information of the refueling aircraft 130 for duration of a refueling event and reports aerial refueling data. A practical embodiment of the system 800 comprises additional components and elements configured to support known or conventional operating features. For the sake of brevity, conventional techniques and components related to digital signal processing such as channel encoding/decoding, correlation techniques, spreading/dispreading, pulse shaping, radio frequency (RF) technology, and other functional aspects and the individual operating components of the system 800 may not be described in detail herein.

The system 800 may comprises a processor module 802, a memory module 804, a data recorder module 806, a report generator module 808, a range detector module 810, and a display module 812. These and other elements of the system 800 may be interconnected together using a data communication bus 816, or any suitable wired/wireless interconnection arrangement. Such interconnection facilitates communication between the various elements of the system 800. The processor module 802 comprises processing logic that is configured to carry out the functions, techniques, and processing tasks associated with the operation of the fuel inventory control system 800. In particular, the processing logic is configured to support the function of the system 800 described herein. For example, the processor module 802 may be suitably configured to receive the identification information of the refueling aircraft 130 from the fuel delivery aircraft RFID transceiver 704 along with the associated refueling data from a fuel control unit of the fuel delivery aircraft 110 to suitably carry out operation of the inventory control system 718. For example, the processor module 802 continuously and automatically receives the identification information of the refueling aircraft 130 for the duration of the refueling event, and automatically terminates the refueling event when the refueling aircraft is outside a range of the fuel delivery aircraft, to provide accurate aerial refueling data. As mentioned above, in practical embodiments the processor module 802 may be resident in the refueling aircraft 130 and/or may be part of a network architecture that communicates with the refueling aircraft 130, or be a standalone portable device.

The processor module 802 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor module 802, or in any practical combination thereof. A software module may reside in the memory module 804, which may be realized as RAM memory, flash memory, ROM memory, EPROM memory, EEPROM memory, registers, a hard disk, a removable disk, a CD-ROM, or any other form of storage medium known in the art. In this regard, the memory module 804 may be coupled to the processor module 802 such that the processor module 802 can read information from, and write information to, memory module 804. For example, processor module 802 and the memory module 804 may be in respective ASICs. The memory module 804 may also be integrated into the processor module 802. In an embodiment, the memory module 804 may include a cache memory for storing temporary variables or other intermediate information during execution of instructions to be executed by processor module 802. Memory module 804 may also include non-volatile memory for storing instructions to be executed by the processor module 802.

The memory module 804 may comprise an aerial refueling database (not shown) in accordance with an example embodiment of the invention. The aerial refueling database may be configured to store, maintain, and provide data as needed to support the functionality of system 800 in the manner described below. Moreover, an aerial refueling database may be a local database coupled to the processor 802, or may be a remote database, for example, a central network database, and the like. The aerial refueling database may be configured to maintain, for example but without limitation, the aerial refueling data, such as but without limitation, fuel type, gallons transferred, pump speed gal./min duration of refueling operation, aircraft tail number, aircraft type, aircraft group, and the like.

The data recorder module 806 may be coupled to the processor module 802 and configured to automatically record the refueling data in response to a refueling event and measure the duration of the refueling event. The data recorder module 806 automatically measures the duration of the refueling event. The duration of the refueling event may be measured by recording the start time of the fueling, and the stop time of the fueling, and taking the difference. The data recording module 806 automatically logs the identifier of the refueling aircraft substantially just prior to a start of the refueling event, and the refueling data in response to a completion of the refueling event.

The report generator module 808 may be coupled to the data recorder module and is configured to automatically generate a refueling report in response to an end-refueling indicator. The report generator module initiates generating the refueling report substantially at a beginning of the refueling event. Various reports and other output data can be generated as an output of the report generator module 808. For example, the data recorder module 806 can automatically provide the refueling data to the report generator module 808 and the reporter module can produce a report comprising the aerial refueling data. As explained above, the aerial refueling data may comprise, for example but without limitation, fuel type, gallons transferred, pump speed gal./min duration of refueling operation, aircraft tail number, aircraft type, aircraft group, and the like. The report generator module 808 may be equipped with a port (not shown) for downloading information relating to the fueling operation with the refueling aircraft 130 for printing on board, for later transfer, for later transmission or for later printing, whether on-board the fuel delivery aircraft 110 or elsewhere. In practice, operation of the system 800 is a substantially electronic process, however printing is anticipated to be an optional function of the system 800 for preparation of paperwork. For example but without limitation, a DoD Form 791 which is a Department of Defense form accounting for fuel transfers, or similar international fuel recording forms may be used for recording a fueling operation with the refueling aircraft 130, identifying the refueling aircraft 130, and the like.

The range detector module 810 is configured to generate an in-range indicator when the refueling aircraft 130 is within a range of the fuel delivery aircraft 110, and to generate an out-of-range indicator when the refueling aircraft 130 is outside of the range of the fuel delivery aircraft 110. The range detector module 810 can automatically terminate the refueling event by generating the end-refueling indicator, if the refueling aircraft 130 is outside of the range of the fuel delivery aircraft 110. Generally, interrogation sequences for passive tag RFID systems begin with a preamble or tag energizing section, during which a continuous wave ("CW") carrier is transmitted from the RFID reader such as the fuel delivery aircraft RFID transceiver 704 to initialize and energize RFID tags such as the refueling aircraft RFID transponder 702 located within the RF range of the reader. During the preamble, no information or data is transmitted by the RFID reader. An interrogation sequence may also comprise a command and control data section, during which information is conveyed to the RFID tags. Such information may vary from system to system, and they may vary depending upon the given RFID protocol. For example, the interrogation sequence may comprise a RFID tag response section corresponding to the period during which the RFID tag responds to the RFID reader. During this period, the RFID reader transmits a CW signal and the RFID tag (or tags) reflects the CW signal in an amplitude modulated manner that conveys the RFID tag information back to the RFID reader. Specific details of RFID interrogation sequences and their content are known to those skilled in the art and, therefore, will not be discussed herein. In this manner, the fuel delivery aircraft RFID transceiver 704 (RFID reader) can determine whether the refueling aircraft RFID transponder 702 (tag) is within its range.

The display module 812 comprises an indicator display 814 to display the in-range indicator when the refueling aircraft is within the range of the fuel delivery aircraft 110. The display module 812 cancels the in-range indicator in response to the out-of-range indicator and displays the out-of-range indicator instead on the indicator display 814. The display module 812 may comprise an image display device such as but without limitation, a light emitting diode (LED) display, a liquid crystal display (LCD), or an organic EL display (OLED). The display module 812 may be used to display an image corresponding to images provided by the processor module 802.

Embodiments of the disclosure provide a method for utilizing a passive RFID tag and reader combination to automatically identify a refueling aircraft during in-flight refueling as explained below. Identification data and amount of fuel off-loaded is then stored on a computing device such as the fuel inventory control system 800 along with the other pertinent refueling data. An electronic transaction is then built and transmitted to appropriate systems for accurate billing or other forms of data utilization as explained in more detail below.

Figure 9:
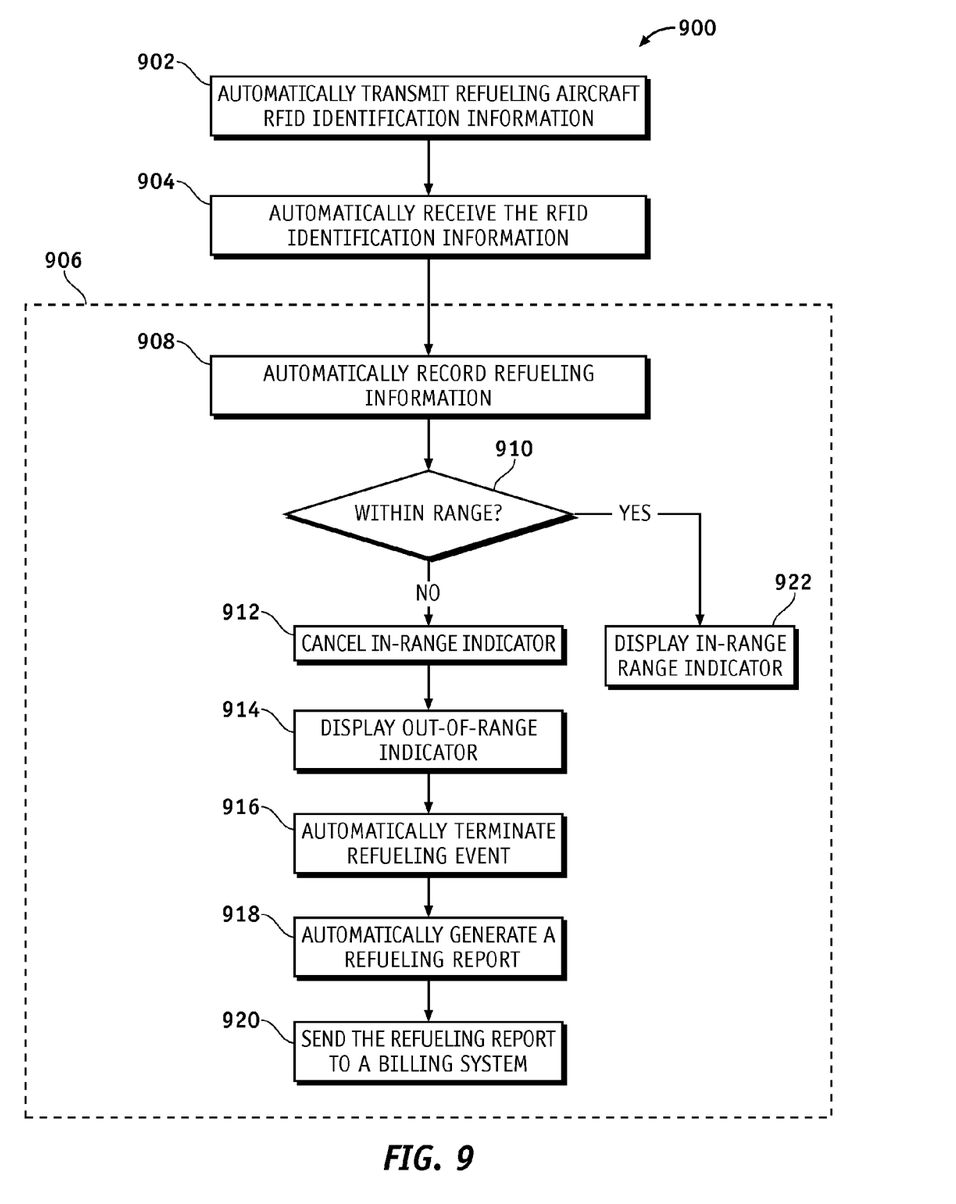
FIG. 9 is an illustration of a flowchart showing an exemplary process for providing aerial refueling identification and fuel inventory control according to an embodiment of the disclosure.

FIG. 9 is an illustration of a flowchart showing an example process 900 for providing aerial identification and fuel inventory control according to an embodiment of the disclosure. A refueling aircraft transmits an identifier identifying the refueling aircraft in proximity to a fuel delivery aircraft. The identifier is automatically logged in the fuel inventory control system, and upon completion of fueling, a quantity of fuel off-loaded is automatically logged in the fuel inventory control system, and a report is automatically generated. The various tasks performed in connection with process 900 may be performed by software, hardware, firmware, or any combination thereof. For illustrative purposes, the following description of process 900 may refer to elements mentioned above in connection with FIGS. 1-8. In practical embodiments, portions of process 900 may be performed by different elements of aircraft structures and electronic devices 100-800. Process 900 may have functions, material, and structures that are similar to the embodiments shown in FIGS. 1-8. Therefore common features, functions, and elements may not be redundantly described here.

Process 900 may begin by continuously automatically transmitting RFID identification information of a refueling aircraft in response to a query from the fuel delivery aircraft 110/410 substantially just prior to a refueling event (task 902).

The process 900 may then continue by automatically receiving the RFID identification information at the fuel delivery aircraft 110/410 in response to the refueling event (task 904). Process 900 may stop transmission of the RFID identification information, once the RFID identification information is received at the fuel delivery aircraft 110/410. Process 900 converts the identification information (identifier) into a digital format for processing by the processor 800. The duration of the refueling event is determined by measuring a time duration from a start of the refueling event to an end of the refueling event.

The process 900 initiates generating the refueling report substantially at a beginning of the refueling event. The beginning of fueling (fuel contact) may be established by a boom operator who starts fuel flow, or may be established according to various MPRS/Probe and Drogue methods, and the like.

In response to a start of fueling the refueling aircraft 130, the identifier is automatically logged in the fuel inventory control system 718. Upon completion of the fueling, a quantity of off-loaded fuel associated with the identifier is automatically logged in the fuel inventory control system 718. A fueling report is then automatically generated (block 906).

The process 900 may then automatically record the refueling information in response to a completion of the refueling event (task 908).

If the refueling aircraft 130 is outside the range of the fuel delivery aircraft 110 (The "No" branch of inquiry task 910), process 900 cancels the in-range indicator (task 912), displays an out-of-range indicator (task 914), and automatically terminates the RFID transmissions and may display an end-fueling indicator (task 916), or a refueling not conducted indicator (not shown). The range may be, for example but without limitation, about 35 meters or less depending upon the wireless radio communication environment 700, an aerial refueling operation 100/200, and configuration of the refueling aircraft 130/430 and the fuel delivery aircraft 110/410.

The process 900 may then automatically generate a refueling report in response to the end of the refueling event (task 918).

The process 900 may then send the refueling report to a billing system and the like (task 920).

If the refueling aircraft 130 is within the range of the fuel delivery aircraft 110 (The "Yes" branch of inquiry task 910), process 900 may display the in-range indicator (task 922).

In this way, embodiments of the disclosure provide systems and methods that provide electronic bookkeeping and fuel inventory control for aerial refueling, thereby increasing accuracy, reducing crew workload, and eliminating or significantly reducing Air Force losses due to non-reimbursement for fuel off-loaded.

When implemented in software or firmware, various elements of the systems 700-800 described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, an RF link, or the like.

Those skilled in the art will understand that the various illustrative blocks, modules, circuits, and processing logic described in connection with the embodiments such as systems 700-800 disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-9 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A system for automatically reporting aerial refueling data, the system comprises:
   a Radio Frequency Identification (RFID) transponder coupled to a refueling aircraft and operable to automatically transmit identification information for the refueling aircraft;
   an RFID transceiver coupled to a fuel delivery aircraft and operable to automatically receive the identification information;
   a data recorder module operable to automatically record refueling data for the refueling aircraft; and
   a fuel inventory control system operable to electronically build and transmit at least one transaction for a refueling to a billing system, and comprising:
      a range detector module operable to automatically generate an end-refueling indicator after a beginning of the refueling when the refueling aircraft is outside a RFID range of the fuel delivery aircraft where the RFID transponder conveys information back to the RFID transceiver; and
      a report generator module coupled to the data recorder module and operable to automatically generate a refueling report in response to the end-refueling indicator.

2. The system for automatically reporting aerial refueling data according to claim 1, wherein the data recorder module is further operable to automatically measure a duration of refueling.

3. The system for automatically reporting aerial refueling data according to claim 1, wherein the range detector module is further operable to:
generate an in-range indicator when the refueling aircraft is within the RFID range of the fuel delivery aircraft; and
generate an out-of-range indicator when the refueling aircraft is out of the RFID range of the fuel delivery aircraft.

4. The system for automatically reporting aerial refueling data according to claim 3, further comprising a display operable to:
display the in-range indicator when the refueling aircraft is within the RFID range of the fuel delivery aircraft;
cancel the in-range indicator in response to the out-of-range indicator; and
display the out-of-range indicator if the in-range indicator is canceled.

5. The system for automatically reporting aerial refueling data according to claim 3, wherein the report generator module is further operable to generate the refueling report in response to the out-of-range indicator.

6. The system for automatically reporting aerial refueling data, according to claim 1, wherein the refueling report comprises at least one data item selected from the group consisting of: a fuel type, a fuel quantity transferred, a pump speed, a duration of a refueling operation, an aircraft tail number, an aircraft type, and an aircraft group.

7. A method for automatically reporting aerial refueling data, the method comprises:
automatically transmitting Radio Frequency identification (RFID) identification information for the refueling aircraft from an RFID tag coupled thereto;
automatically receiving the RFID identification information at an RFID reader coupled to a fuel delivery aircraft;
activating the RFID tag to establish a wireless radio communication with the RFID reader in response to establishing a contact between the refueling aircraft and a fuel delivery aircraft for a refueling;
generating an in-range indicator indicating the refueling aircraft is within a RFID range of the fuel delivery aircraft, while the RFID tag is wirelessly communicating with the RFID reader;
generating an out-of-range indicator indicating the refueling aircraft is out of the RFID range of the fuel delivery aircraft, if the RFID tag is not wirelessly communicating with the RFID reader;
providing an end-refueling indicator when the refueling aircraft is outside the RFID range of the fuel delivery aircraft;
automatically recording refueling data for the refueling aircraft in response to the end-refueling indicator; and
automatically electronically building and transmitting at least one transaction to a billing system.

8. The method for automatically reporting aerial refueling data according to claim 7, further comprising automatically initiating generation of a refueling report at a beginning of the refueling.

9. The method for automatically reporting aerial refueling data, according to claim 7, further comprising automatically measuring a duration of refueling.

10. The method for automatically reporting refueling aerial data according to claim 7, further comprising:
displaying the in-range indicator when the refueling aircraft is within the RFID range of the fuel delivery aircraft;
canceling the in-range indicator when the refueling aircraft is out of the RFID range of the fuel delivery aircraft; and
displaying the out-of-range indicator if the in-range indicator is canceled.

11. The method for automatically reporting aerial refueling data according to claim 7, further comprising automatically generating a refueling report in response to the-end-refueling indicator.

12. The method for automatically reporting aerial refueling data according to claim 7, further comprising transferring fuel to the refueling aircraft via a boom.

13. The method for automatically reporting aerial refueling data according to claim 7, further comprising transferring fuel to the refueling aircraft via a hose and drogue.

14. The method for automatically reporting aerial refueling data, according to claim 7, wherein the refueling report comprises at least one data item selected from the group consisting of: a fuel type, a fuel quantity transferred, a pump speed, a duration of a refueling operation, an aircraft tail number, an aircraft type, and an aircraft group.

15. A fuel inventory control system for aerial refueling, the system comprising:
a Radio Frequency Identification (RFID) reader operable to identify a refueling aircraft to obtain an identifier;
refueling means operable to refuel the refueling aircraft;
an RFID tag coupled to the refueling aircraft and operable to be activated in response to establishing a contact for refueling to establish a wireless radio communication with the RFID reader to provide an established wireless communication;
range detector means operable to automatically:
generate an in-range indicator indicating the refueling aircraft is within a RFID range of a fuel delivery aircraft while the RFID tag is wirelessly communicating with the RFID reader via the established wireless communication;
generate an out-of-range indicator indicating the refueling aircraft is out of the RFID range of the fuel delivery aircraft if the RFID tag is not wirelessly communicating with the RFID reader; and
provide an end-refueling indicator when the refueling aircraft is outside the RFID range of the fuel delivery aircraft; and
data recording means operable to automatically log:
the identifier of the refueling aircraft; and
refueling data in response to the end-refueling indicator.

16. The fuel inventory control system, according to claim 15, wherein the refueling data comprises at least one data item selected from the group consisting of: an amount of fuel off-loaded on the refueling aircraft, a fuel type, a fuel quantity transferred, a pump speed, a duration of a refueling operation, an aircraft tail number, an aircraft type, and an aircraft group.

17. The fuel inventory control system according to claim 15, further comprising a reporting means operable to automatically generate a refueling report when the refueling is completed.

18. The system for automatically reporting aerial refueling data according to claim 1, wherein the data recorder module is further operable to record the identification information.

19. The system for automatically reporting aerial refueling data according to claim 1, wherein the data recorder module is further operable to automatically record the refueling data in response to the fuel delivery aircraft establishing a contact with the refueling aircraft for refueling.

* * * * *